United States Patent [19]
Conley

[11] 3,862,761
[45] Jan. 28, 1975

[54] TALKING TAPE MEASURE
[75] Inventor: Dwain D. Conley, Huntington Beach, Calif.
[73] Assignee: Mattel, Inc., Hawthorne, Calif.
[22] Filed: Nov. 15, 1973
[21] Appl. No.: 416,146

[52] U.S. Cl. .................................. 274/1 A, 33/138
[51] Int. Cl. ........................................... G11b 15/42
[58] Field of Search .......... 33/138, 139; 274/1, 1 A, 274/1 C, 1 E

[56] References Cited
UNITED STATES PATENTS
| | | | |
|---|---|---|---|
| 2,920,393 | 1/1960 | Schoenfeldt | 33/138 |
| 3,662,969 | 5/1972 | King | 33/138 |
| 3,666,275 | 5/1972 | Heine | 274/1 A |
| 3,675,334 | 7/1972 | Quenut | 33/158 |

Primary Examiner—Richard E. Aegerter
Assistant Examiner—A. J. Mirabito
Attorney, Agent, or Firm—Max E. Shirk

[57] ABSTRACT

Drawstring on a spring wound phonograph is wound about a string drum connected to a tape-measure drum which carries a tape measure for winding drawstring on string drum when tape measure is withdrawn to make a measurement. Phonograph spring recoils the tape measure during playing of a message. The tape measure may be retained in an extended position by a releasable latch.

2 Claims, 5 Drawing Figures

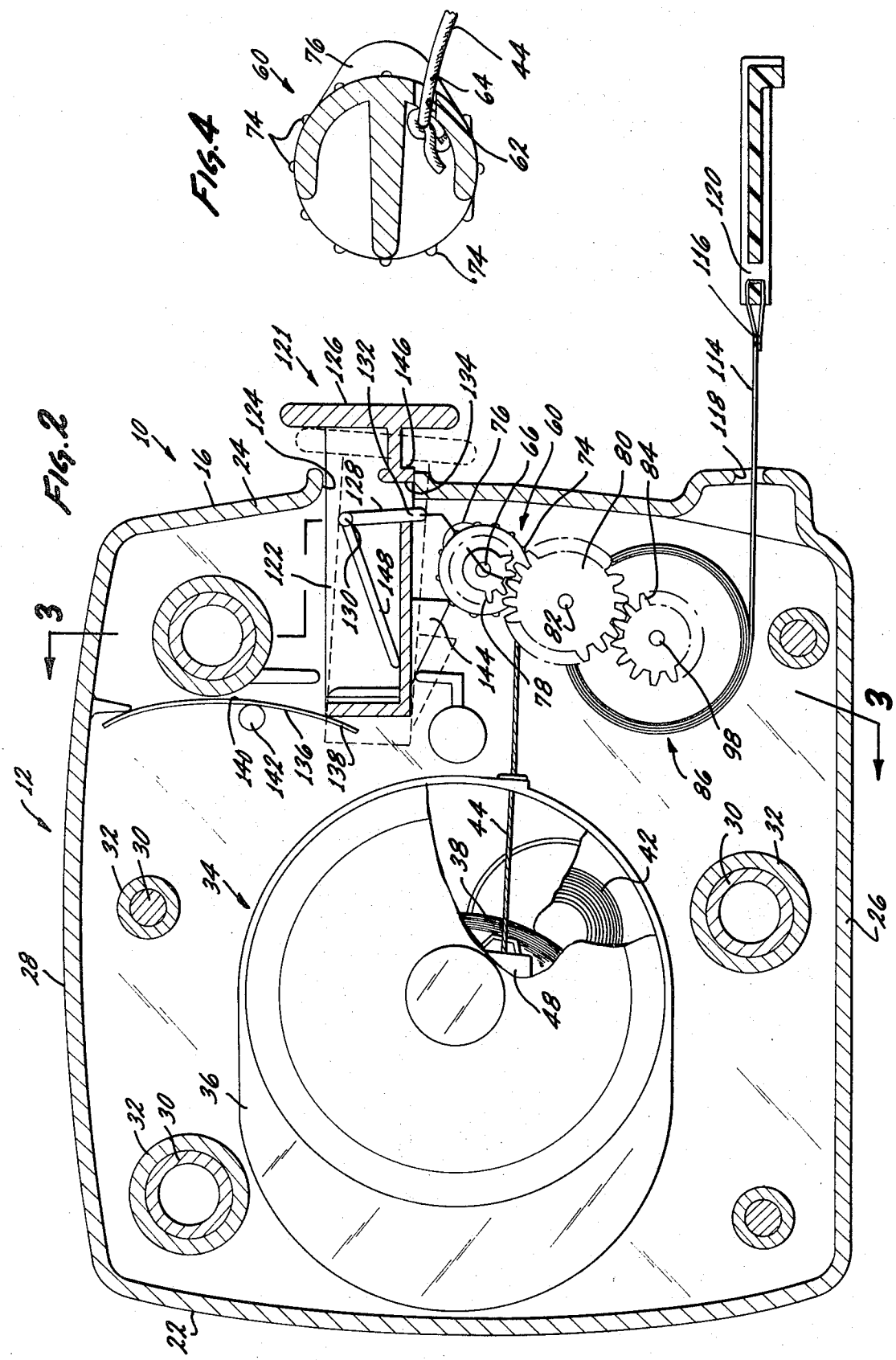

TALKING TAPE MEASURE

BACKGROUND OF THE INVENTION

The background of the invention will bet set forth in two parts.

1. Field of the Invention

The present invention pertains generally to the field of tape measure toys and more particularly to such a toy which includes a phonograph mechanism which is actuated to play a suitable message when a tape measure is withdrawn from the toy.

2. Description of the Prior Art

The prior art known to applicant is listed by way of illustration, but not of limitation, in separate communications to the United States Patent Office.

The present invention exemplifies improvements over this prior art.

SUMMARY OF THE INVENTION

It is a primary object of the present invention to provide a new and useful tape measure toy.

It is another object of the invention to provide a talking tape measure toy.

According to the present invention, a talking tape measure toy includes a phonograph device having recorded-message carrier means and means for controlling operation of the recorded message carrier means. The controlling means may be moved from an energy-storing position to an energy-releasing position to energize the recorded-message carrier means for playing a message recorded thereon.

The toy also includes a coiled tape measure which is mounted adjacent the controlling means for moving the controlling means from its energy-releasing position to its energy-storing position when the tape measure is uncoiled to make a measurement. Suitable means are employed to connect the tape measure to the controlling means so that the message will be automatically played following the uncoiling of the tape measure.

The controlling means is shown and described herein for purposes of illustration, but not of limitation, as comprising the drawstring on a spring-wound phonograph device. The free end of the drawstring is connected to a string drum rotatably mounted adjacent the recorded-message carrier means so that rotation of the string drum will withdraw the drawstring from the phonograph device to wind its spring. The tape measure is coiled about a tape-measure drum rotatably mounted adjacent the string drum and suitable gear means are employed to connect the tape-measure drum to the string drum in such a manner that rotation of the tape-measure drum when the tape measure is withdrawn to make a measurement imparts rotation to the string drum for winding the drawstring thereon to, in turn, wind the spring motor.

A suitable latch means is employed to hold the string drum against rotation until it is desired to release the tape measure, whereupon the latch may be released. The spring motor will then rewind the drawstring into the phonograph device while the tape measure is being rewound upon its drum due to the rotation imparted thereto by the string drum and gear means.

The features of the present invention which are believed to be novel are set forth with particularity in the appended claims. The present invention, both as to its organization and manner of use, together with further objects and advantages thereof, may best be understood by reference to the following description, taken in connection with the accompanying drawings in which like reference characters refer to like elements in the several views.

BRIEF DESCRIPTION OF THE DRAWINGS

FIG. 2 is a cross-sectional view taken along line 2—2 of FIG. 1;

FIG. 3 is a cross-sectional view taken along line 3—3 of FIG. 2;

FIG. 4 is a cross-sectional view taken along line 4—4 of FIG. 3; and

DESCRIPTION OF THE PREFERRED EMBODIMENT

Figure 1:
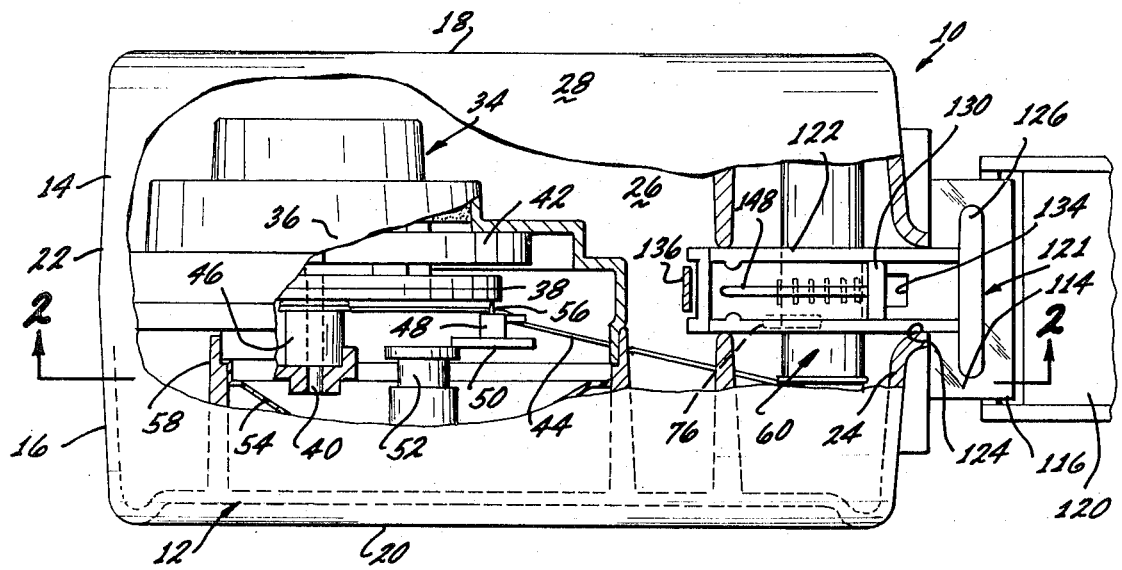
FIG. 1 is a top plan view of a talking tape measure of the present invention with portions of the cover removed to show internal construction.
Figure 3:
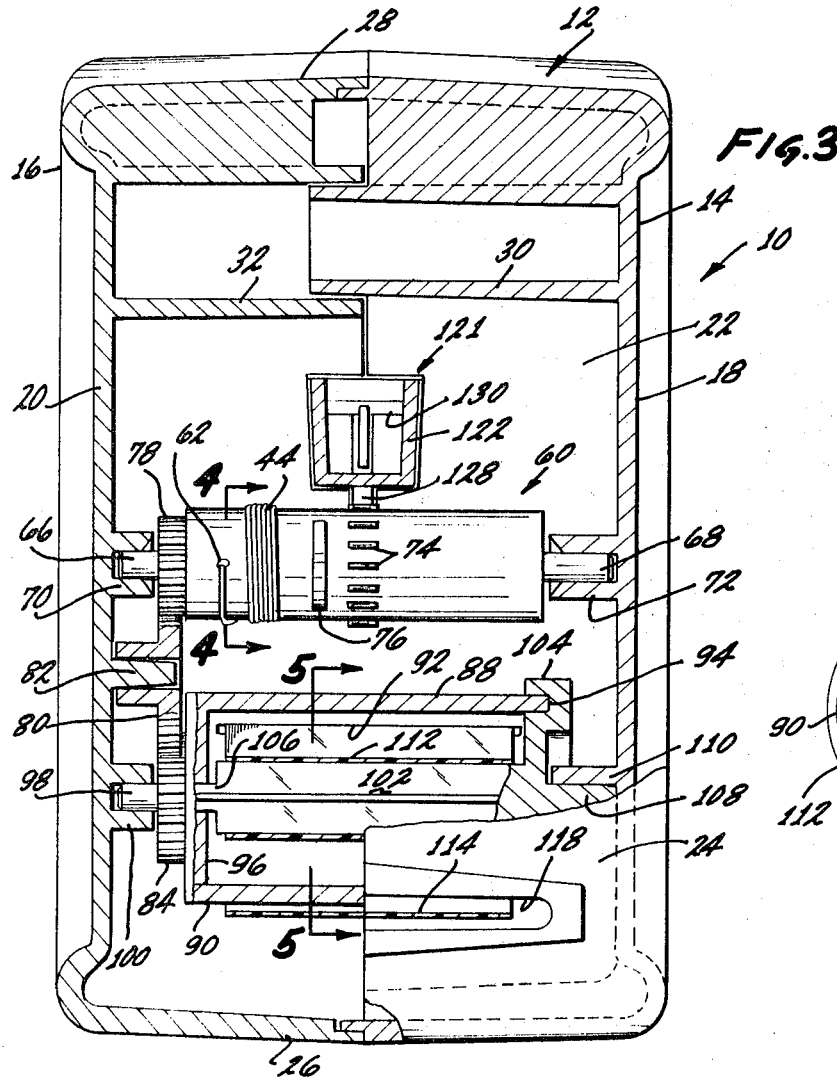
FIG. 3 is a cross-sectional view taken along line 2—2 of FIG. 1.

Referring again to the drawings, a talking tape measure toy constituting a presently-preferred embodiment of the invention, generally designated 10, includes a housing 12 having a front housing half 14, a rear housing half 16, a front wall 18, a rear wall 20, a left side wall 22, a right side wall 24, a bottom wall 26 and a top wall 28. The housing halves 14, 16 may be connected together by a plurality of positioner pins 30, which are carried by the front housing half 14 and which engage associated ones of a plurality of positioner sleeves 32 carried by the rear housing half 16.

Toy 10 also includes a phonograph device 34 which is shown herein for purposes of illustration, but not of limitation, as being a spring-wound, drawstring-operated phonograph of the type shown and described in detail in U.S. Pat. No. 3,720,117, which is hereby incorporated herein by reference. Phonograph device 34 includes a housing 36 in which a recorded-message carrier 38 is rotatably mounted on a spindle 40. A power spring 42 is connected to recorded-message carrier 38 for driving it in a playing direction and may be wound by reversely rotating recorded-message carrier 38 with a drawstring 44 which is coiled about a string arbor 46 carried by recorded-message carrier 38. Drawstring 44 is trained through a tone arm 48 for automatically lifting and returning tone arm 48 to the beginning-of-play on recorded-message carrier 38 when drawstring 44 is withdrawn from housing 36 to rewind spring 42. Tone arm 48 includes a rub bar 50 slideably engaging a piston 52 on a speaker cone 54 for transmitting vibrations from recorded-message carrier 38 to speaker cone 54 through a stylus 56, tone arm 48, rub bar 50 and piston 52.

Figure 5:
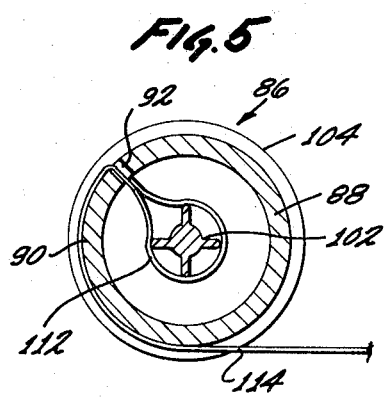
FIG. 5 is a cross-sectional view taken along line 5—5 of FIG. 3.

Phonograph device 34 may be mounted in housing 12 by seating housing 36 in a cylindrical boss 58 extending from rear wall 20 adjacent a string drum 60 which is provided with a small aperture 62 adapted to receive the free end 64 (FIG. 4) of drawstring 44 so that drawstring 44 may be withdrawn from housing 36 to wind spring 42 by rotating string drum 60 in a counterclockwise direction, as viewed in FIG. 2. String drum 60 has the cross-sectional shape shown in FIG. 4 to facilitate molding it as a one-piece assembly from a suitable acetal resin material and includes a pair of journals 66, 68 rotatably mounted in bearings 70, 72, respectively, carried by rear wall 20 and front wall 18, respectively. String drum 60 carries a plurality of serrations 74 and an outwardly-extending tip 76 on its outer surface and is provided with a small gear 78 adjacent journal 66. Gear 78 drivingly engages an idler gear 80 rotatably mounted on a pin 82 extending from rear wall 20. Idler gear 80 also drivingly engages a gear 84 carried by a tape-measure drum 82 including a cylindrical body portion 88 having an encompassing side wall 90, which is provided with a longitudinal slot 92, an open end 94 and a closed end 96. Closed end 96 not only carries gear 84, but also carries a journal 98 rotatably mounted in a bearing 100 carried by rear wall 20. Tape-measure drum 86 also includes a tape-receiving spindle 102 which includes an end cap 104 rotatably receiving open end 94 of cylindrical member 88. Tape-receiving spindle 102 carries a first journal 106, which is rotatably mounted in end wall 96 of cylindrical member 88, and a second journal 108, which is carried by end cap 104 and is journaled in a bearing 110 carried by front wall 18. Spindle 102 receives the looped end 112 (FIG. 5) of a tape measure 114 normally coiled about tape drum 86. Tape measure 114 includes a free end 116 which extends through a slot 118 in right side wall 24 and which is prevented from recoiling into housing 12 by a clip 120. It will be apparent to those skilled in the art that drawstring 44 may be wound onto string drum 60 by pulling tape 114 from housing 12 and that tape 114 will be rewound onto tape drum 86 when drawstring 44 is pulled into phonograph housing 36 under the influence of spring 42 when it rotates recorded-message carrier 38 in a message-playing direction.

The play value of toy 10 may be enhanced by providing it with an operating button 120 having a channel-shaped body portion 122 slideably mounted in an opening 124 in right side wall 24 and a head 126 disposed outside of housing 12. A pawl 128 is swingably mounted in body portion 122 on a pivot pin 130 and includes a free end 132 extending through an opening 134, which is provided in body portion 122, into the path-of-travel of tip 76 for engagement thereby to move button 120 from the position shown in broken lines in FIG. 2 to the position shown in solid lines. When string drum 60 is rotated in a counterclockwise direction by pulling tape 114 from housing 12. Button 120 is biased to the position shown in solid lines in FIG. 2 by a leaf spring 136 having a first end 138 seated in body portion 122 and a second end 140 engaged behind a fixed pin 142 carried by rear housing half 16. In this position, a fixed tooth 144, which depends from body portion 122, engages serrations 74 to prevent clockwise rotation of string drum 60 until button 121 is moved to its broken line position causing tooth 144 to move away from serrations 74. Button 121 may be retained in its broken line position by a shoulder 146 on body portion 122 which becomes engaged behind right side wall 24. A light, plastic leaf spring 148 may be molded integrally with pawl 128 to compensate for the interference between tip 76 and pawl 132 when string drum 60 rotates in a clockwise direction during playing of phonograph device 34. At the end of play, tape 114 will be withdrawn into housing 12 and button 121 will be in its broken line position. When tape 114 is again withdrawn from housing 12, tip 76 will engage pawl 132 to move button 121 to its solid line position wherein tooth 144 rides on serrations 74 to produce a clicking sound while string 44 is being wound onto drum 60. Upon release of tape measure 114, button 121 will remain in its solid line position and tooth 144 will engage one of the serrations 74 to prevent playing of phonograph device 34 until button 121 is moved to its broken line position. Body portion 122 of button 121 may be guided during this movement by a partition 150 provided in housing 12.

It will be seen that the present invention provides a new and useful talking tape measure toy comprising a phonograph device including a recorded-message carrier means and means, including string drum 60 and button 121, for controlling the operation of the recorded-message carrier means by providing an energy-storing position and an energy-releasing position and that tape measure 114 moves the controlling means from the energy-releasing position to the energy-storing postion when tape measure 114 is uncoiled to make a measurement by withdrawing it from housing 12.

While the particular talking tape measure toy herein shown and described in detail is fully capable of attaining the objects and providing the advantages hereinbefore stated, it is to be understood that it is merely illustrative of the presently preferred embodiment of the invention that no limitations are intended to the details of construction or design herein shown other than as defined in the appended claims, which form a part of this disclosure. Whenever the term "means" is employed these claims, this term is to be interpreted as defining the corresponding structure illustrated and described in this specification or the equivalent of the same.

What is claimed is:

1. A talking tape measure toy, comprising:
   a phonograph device having a drawstring, said drawstring having a free end which may be pulled to withdraw said drawstring from said phonograph device for energizing said phonograph device;
   a string drum rotatably mounted adjacent said phonograph device, said free end of said drawstring being attached to said string drum, whereby said drawstring may be withdrawn from said phonograph device by winding said drawstring onto said string drum;
   a tape-measure drum rotatably mounted adjacent said string drum;
   a tape measure having one end secured to said tape-measure drum; and
   gear means connecting said tape-measure drum to said string drum in such a manner that winding energy administered to one of said drums is transferred to the other of said drums.

2. A talking tape measure toy as stated in claim 1 including latch means for automatically locking said string drum after said drawstring has been wound thereon.

* * * * *